United States Patent [19]
Armstrong et al.

[11] 3,727,040
[45] Apr. 10, 1973

[54] PERCUSSIVE PHOTOFLASH LAMP ARRAY

[75] Inventors: Donald E. Armstrong, Williamsport; David R. Broadt, Lewisburg; John J. Vetere, Williamsport, all of Pa.

[73] Assignee: GTE Sylvania Incorporated, Danvers, Mass.

[22] Filed: June 6, 1972

[21] Appl. No.: 260,271

[52] U.S. Cl. ....................240/1.3, 95/11 L, 431/93
[51] Int. Cl. .................................................G03b 15/02
[58] Field of Search....................240/1.3, 37.1; 95/11 L; 431/93, 95 R, 95 A, 92

[56] References Cited

UNITED STATES PATENTS

| | | | |
|---|---|---|---|
| 3,238,749 | 3/1966 | Reiber et al. | 240/1.3 X |
| 3,418,906 | 12/1968 | Wick et al. | 240/1.3 X |
| 3,630,131 | 12/1971 | Harvey | 95/11 L |
| 3,665,176 | 5/1972 | Shaffer et al. | 240/1.3 |

FOREIGN PATENTS OR APPLICATIONS 1,192,517  5/1965  Germany..............................240/1.3

Primary Examiner—Samuel S. Matthews
Assistant Examiner—Fred L. Braun
Attorney—Norman J. O'Malley et al.

[57] ABSTRACT

A photoflash unit comprising a plurality of axially mounted, percussively-ignitable flashlamps arranged in a planar array with respectively associated reflectors and preenergized striker springs. The unit is receivable on a camera having a shutter responsive actuating member and includes a mechanism for sequentially releasing the striker springs to fire respective flashlamps in response to successive indexing by the camera actuating member. All reflectors of the array face in one direction, and each reflector is of flatted parabolic shape and disposed coaxially about its associated flashlamp so that the longitudinal axis of the flashlamp is substantially collinear with the optical axis of the reflector.

11 Claims, 5 Drawing Figures

PATENTED APR 10 1973 3,727,040
SHEET 1 OF 2
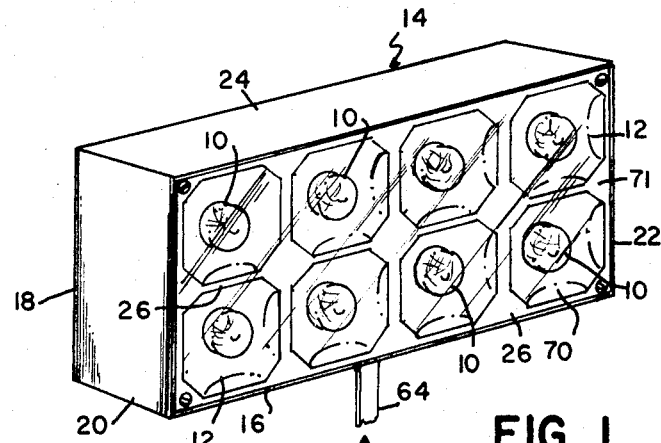
FIG. 1
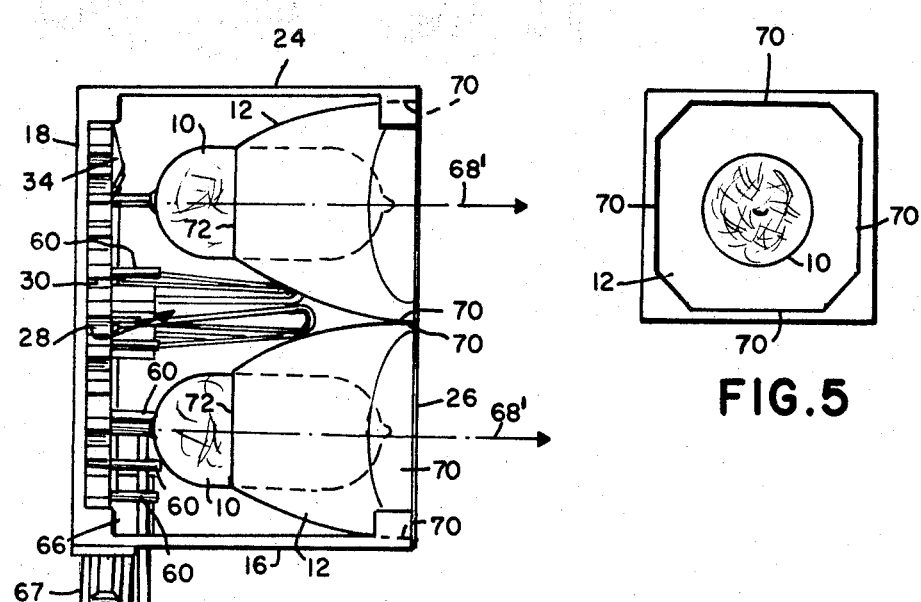
FIG. 3
FIG. 5

PERCUSSIVE PHOTOFLASH LAMP ARRAY

BACKGROUND OF THE INVENTION

This invention relates to multilamp photoflash units and, more particularly, to an array configuration of percussively-ignitable photoflash lamps with associated reflectors and firing means.

The trend in photoflash devices has been toward the use of subminiature flashlamps (an envelope volume of less than 1 cubic centimeter) in compact, disposable, multilamp units to provide camera users with the advantages of greater convenience, compactness and portability. A currently popular flashlamp unit of this type is known generally in the trade as a flashcube, a specific embodiment of which is shown in U.S. Pat. No. 3,327,105, for example. The unit comprises a set of four flashlamps, each with its own reflector, mounted on a base and enclosed within a transparent cover, with each of the lamp-reflector assemblies facing a respective one of the four side walls of the cube. A spindle depends from the center of the flashcube base for operatively retaining the unit in a complementary receiving socket on a camera. In operation, the flashcube is sequentially rotated a quarter of a turn at a time, usually in response to each operation of the film advance mechanism of the camera, to successively place unused lamps in a firing position facing the object being photographed. Each of the flashlamps consists of an hermetically sealed, light transmitting glass envelope containing a filamentary combustible material, such as oxygen. In the case of flashcubes employing electrically ignited lamps, a pair of lead-in wires pass through the lamp envelope to support therein a filament in combination with globules of ignition paste. When the flashcube is in the firing position, segments of the lead-in wires disposed outside the lamp envelope are securely engaged with electrical contacts in the camera socket, which in turn are connected by wires and a shutter actuated switch to the camera power source, usually a pair of dry cell batteries. When a photographer actuates the shutter release mechanism to "snap" a picture, he also, by the same operation, closes the electrical circuit from the batteries to the ignition system in the lamp to thereby flash the lamp. The timing of the ignition of the combustion material in the lamp is synchronized with the exposure of the film by actuation of the shutter release so that efficient utilization of the light from the flashlamp may be obtained.

A not infrequent problem has been faced by the average amateur photographer when using a battery operated flash system, however, has been failure of the lamp to fire due to weak batteries and/or dirt or corrosion on one or more of the electrical contacts in the system. To overcome this problem and provide improved flashlamp reliability, percussive-type flashlamps have been developed which may be mechanically fired without the need for batteries. As described in U.S. Pat. No. 3,535,063, for example, such flashlamps have a mechanical primer sealed in one end of the lamp in lieu of lead-in wires. This primer may comprise a metal tube extending from the envelope and a charge of fulminating material on a wire supported in the tube. Operation of the percussive flashlamp is initiated by an impact onto the tube to cause deflagration of the fulminating material up through the tube to ignite the combustible material disposed in the lamp envelope. The percussive-type lamps are also produced in subminiature envelope sizes and are employed in percussive flashcube units having respective preenergized striker springs associated with each lamp, as described in U.S. Pat. No. 3,597,604. The percussive flashcube is indexed into firing position similarly to the electrical flashcube; however, the flashlamp to be used is fired by the action of a member, associated with the camera shutter mechanism, moving up through the flashcube base to release the respective preenergized striker spring, whereby it sharply impacts against the primer tube of the lamp.

Another development in the field of multilamp flash units for providing additional convenience and flexibility is the provision of a linear or planar array of flashlamps. In such an arrangement, a plurality of lamps face in the direction of the object being photographed whereby it is possible to rapidly switch from one lamp to another or to flash more than one lamp at a time if additional light is required. Examples of previously described flashlamp arrays are provided by the following U.S. Pat. Nos.: 3,267,272; 3,430,545; 3,438,315; 3,454,756; 3,458,270; 3,473,880; 3,500,732; 3,544,251, 3,545,904; 3,443,875; 3,552,896; 3,562,508; 3,598,984; 3,598,985; 3,608,451; and 3,614,412.

All of these patents describe electrically energized flash systems with the sequence of lamp flashing being controlled by various electrical switching means including: manually controlled spring slide contacts; a rotary switch; thermally or chemically reactive switches placed in thermal proximity to the flashlamps; a switch within each lamp envelope which closes in response to firing to prepare the next lamp in sequence; a voltage surge across the lamps causes ignition of only the lamp having the lowest voltage break down characteristics; bimetallic switches; a meltable junction within each lamp envelope; and solid state switching circuits. Although providing a number of advantages, the electrical arrays are still prone to the reliability problems associated with an electrical flash system, namely, ignition failures due to weak batteries and/or dirty or corroded electrical contacts. As discussed hereinbefore, such problems have previously been overcome in flashcube units by the use of percussive lamps with associated preenergized striker springs. There appears to be no prior art, however, with respect to the packaging and operation of percussive-type flashlamps in an array configuration.

SUMMARY OF THE INVENTION

Accordingly, it is an object of the present invention to provide an improved multiple photoflash lamp array which may be operated without an electrical energy source.

A particular object of the invention is to provide a percussive flashlamp array which is economically and compactly packaged to provide increased light output and which does not require lamp movement during the operating sequence.

Briefly, these objects are attained, in accordance with the invention, by a multilamp flash unit comprising: a base member; a wall member disposed normal to the base member; a plurality of percussively ignitable flashlamps mounted on one side of the wall member with the longitudinal axes of the lamps projecting parallel to the base member; a plurality of preenergized strikers associated with each of the lamps; and, a selective actuating mechanism supported on the wall member and having indexable means for sequentially releasing the strikers to fire associated flashlamps. To enhance light output, the unit further includes an array of substantially concave reflectors each disposed coaxially about a respective flashlamp, with the optical axes of the reflectors being substantially perpendicular to the wall member and the reflectors all facing in one direction away from the side of the wall member upon which the flashlamps are mounted. Compactness is optimized for a desired light output capability by employing parabolic reflectors with flattened sides and arranging the lamps and reflectors in a planar array.

BRIEF DESCRIPTION OF THE DRAWINGS

This invention will be more fully described hereinafter in conjunction with the accompanying drawings in which:

FIG. 1 is a perspective view of a percussive photoflash unit according to the invention;

FIG. 3 is a side view on an enlarged scale of the flash unit of FIG. 1 with the side wall removed to more clearly show the arrangement of the lamps and reflectors;

FIG. 5 is a front view on an enlarged scale of a single lamp-reflector assembly.

DESCRIPTION OF PREFERRED EMBODIMENT

Figure 2:
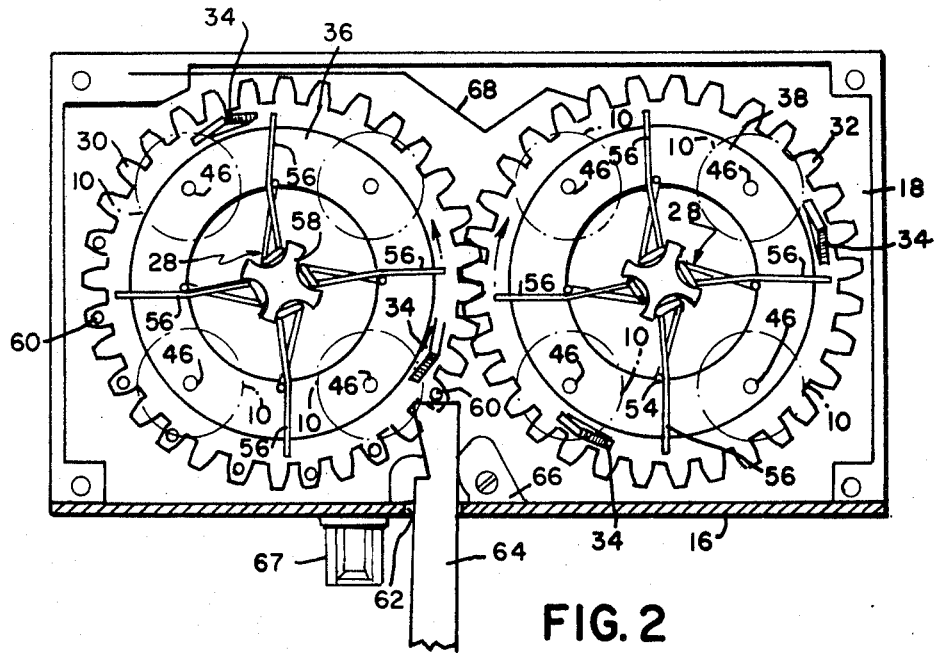
FIG. 2 is a plan view on an enlarged scale of the rear wall of the flash unit of FIG. 1 with the gear actuating mechanism and several spring members shown in full and the several flashlamps associated therewith shown in phantom; the view also includes a sectional representation of the base member to show the aperture therethrough.

FIG. 1 shows a percussive flash unit according to the invention in which a group of eight axially disposed flashlamps 10 and associated coaxial reflectors 12 are arranged in a compact planar array comprising two stacked rows of four lamps each. The array is housed in a box-like container 14 comprising a substantially planar base member 16, a substantially planar rear wall member 18 secured to the base 16 and disposed substantially normal thereto, a pair of side walls 20 and 22, and a top wall 24. Members 16-24 may comprise a unitary structure of molded plastic, or rear wall 18 may be separately attached. Enclosure is completed by a sheet of transparent plastic material 26 attached as a front wall to container 24 and disposed over the light emitting side of the array.

Referring to FIGS. 2 and 3, the flashlamps 10 are mounted on one side of the rear wall member 18 with the longitudinal axes of the lamps projecting parallel to the base member 16. Also mounted on wall member 18 are eight preenergized striker springs 28 each positioned in operative relationship with a respective one of the lamps. As will be described in detail hereinafter, the striker springs are individually releasable to fire the respectively associated lamps. In order to control the sequential operation of the strikers, a selective actuating mechanism is provided in the flash unit, which in the illustrated embodiment comprises a coplanar train of two intermeshing spur gears 30 and 32 each having a number of circumferentially spaced projecting ramps 34. The gears are rotatably mounted on a pair of shafts 36 and 38 fixedly secured at one end to wall member 18. Preferably the shafts comprise integral molded portions of the wall member 18. The free end of each shaft has a substantially planar surface parallel to the plane of the gear mounted thereon, and the gear train is arranged parallel to wall member 18. To enable the desired coaction between the gear mechanism and the lamp firing springs, a cluster of four lamps 10 and four striker springs 28 are symmetrically disposed on the end surface of each gear shaft so as to provide an overall eight lamp array consisting of two parallel rows of four equally spaced lamps. This gear type, selective actuating mechanism is the subject of a copending application Ser. No. 260,286 by David R. Broadt and Donald E. Armstrong, assigned to the assignee of the present application, and filed concurrently herewith.

Figure 4:
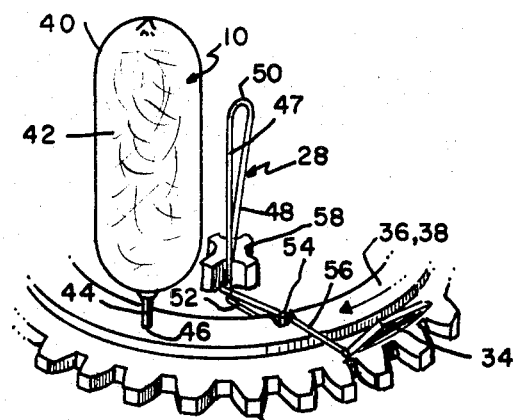
FIG. 4 is a fragmentary view on an enlarged scale of a single lamp-firing spring assembly.

As shown particularly in FIG. 4, each lamp 10 comprises an hermetically sealed light-transmitting envelope 40 of tubular shape having a primer depending therefrom. A filling of combustible foil 42, such as zirconium, and a combustion-supporting gas, such as oxygen, are disposed in the envelope. The primer comprises a metal tube 44 coaxially projecting from the envelope and within which a wire anvil and a charge of fulminating material are disposed. Each lamp is supported on the wall member 18 to project normal therefrom, and thus axially parallel to base 16, by mans of a respective bore 46 into which the primer tube 44 is inserted. That is, there are four bores 46 in each of the shaft end surfaces, as shown in FIG. 2.

Each preenergized striker spring comprises a folded torsion device typically formed from 0.021 inch music wire about 2.5 inches long. The wire is shaped to form a hairpin torsional section having segments 47 and 48 joined by a bight 50. The end portion of segment 47 is shaped to define a stationary supporting foot 52, the tip of which is shaped to define a catch 54. Portions of foot 52 and catch 54 are hidden in FIG. 4. The end portion of segment 48 is shaped to define a striker 56, which when the spring is preenergized, or cocked, as shown, crosses over the supporting foot 52 and is restrained by the catch 54. The stationary supporting foot is seated in an elongated slot formed in the circular end surface of the gear shaft on or near a diagonal thereof, the slot being sufficiently shallow to permit catch 54 to project from the end surface of the shaft.

Initially the striker 56 may be formed at an angle of about 90° to the stationary supporting foot 52, although the angle through which the striker is rotated to position it behind catch 54, as shown, may be of any value that does not cause over stressing of the wire. A center post 58 on the end surface of each gear shaft provides a suitable bearing surface for the heel of the striker during cocking, and it also aids in preventing accidental displacement of the spring 28 sufficient to free the striker from the catch some time after cocking and before firing is intended.

Selective displacement of each cocked striker 56, to release it from catch 54 and thus permit it to strike the respective primer tube 44 and fire the associated lamp 10, is effected by rotational indexing of the gear train. More specifically, as illustrated in FIG. 2, the firing springs 28 on each shaft are arranged with the strikers 56 disposed in a symmetrically radial pattern and projecting beyond the periphery of the circular end surface to overlie a portion of the gear mounted on that shaft. In particular, the free ends of the strikers 56 are disposed to lie in the path of travel of the ramps 34, which project from each gear. Hence, upon rotationally indexing the gear train, the striker adjacent to an oncoming ramp 34, as shown in FIG. 4, is pushed upwardly by the moving ramp a distance sufficient to clear the top of the catch 54. The striker then swings clockwise, as indicated by the arrow, and hits and indents the impact sensitive primer tube 44 at a high velocity to cause deflagration of the fulminating material located therein and thus ignite the combustible foil 42.

To enable indexing of the gear train in equal increments, eight evenly spaced pins 60 are provided along the periphery of gear 30, each of the pins projecting normal to the plane of the gear as illustrated in FIG. 3. The pins 60 are rendered accessible to external actuating means through an aperture 62 provided in base member 16 (FIG. 2). For example, gear indexing may be effected by a suitable actuating member 64 moving up through aperture 62 to engage and push against one of the pins 60, the resulting angular displacement of the gears being determined by the maximum upward travel of member 64. Plastic guide member 66 may be provided over aperture 62 to stabilize the travel of the actuating member 64. In a typical application, actuating member 64 may be part of a camera mechanism designed to enable the photographer to flash a lamp in synchronization with the tripping of the camera shutter to take a picture.

The bottom face of the base 16 may be provided with suitable means for mounting the photoflash array on a camera, or the like. For example, as shown in FIGS. 2 and 3, a mounting post 67 may be provided which is shaped to mate with the socket on a camera of the type generally available for use with percussive flashcubes, such as that described in U.S. Pat. No. 3,602,618 for example. In such cases, either the camera would be modified to render the socket non-rotating, or the post 67 would be allowed to rotate while the base remains stationary. The latter design approach would make the array adaptable for use on a camera which is also usable with rotating flashcubes. In some camera designs it may also be necessary to provide additional spring energy for operating the actuating member 64.

In the present flash unit, eight lamps are available to be sequentially flashed in response to successive indexing of the gear train by member 64. Thus, for example, eight rapid flash exposures may be taken with a camera, without the need for moving the lamps or rotating the unit. The sequence of releasing the strikers in response to indexing is programmed by the number and circumferential location of the ramps 34 on each gear. That is, the ramps 34 are arranged so that for a selected increment $x$ of rotational displacement, the gear travel will cause a first ramp in the train to release a striker and a second ramp in the train to be moved to a position adjacent another preenergized striker 56, as shown in FIG. 4. This pattern of ramp positioning then continues for all successive $x$ increments of rotation until all springs have been released. Typically, each indexing cycle will produce an $x$ increment of gear rotation to provide a single lamp ignition. Some applications, however, may require two or more flashes in rapid succession, in which case each indexing cycle would be designed to produce $2x$ or more increments of rotation. The new position of the gear train is retained after each indexing cycle by means of a spring ratchet 68 which is attached to wall member 18 and adapted to engage the teeth of one of the gears so as to bias the gear against reverse rotation. Hence, by virtue of the mechanical firing system, the ramp programming, and the ratchet control, the present flash unit provides a self-contained memory function, whereby the next unused lamp in the flash sequence will always be ready for immediate triggering, even though the unit may have been removed from a camera and subsequently replaced. This is a significant advantage as compared to electrical arrays.

In accordance with the invention, the several reflectors 12 are compactly and efficiently arranged and configurated as shown in FIGS. 1, 3 and 5. Each concave reflector 12 is disposed coaxially about its associated tubular shaped lamp 10, with the optical axis 68' of the reflector being perpendicular to wall member 18. All reflectors are oriented to face in one direction away from the lamp mounting surface. Each reflector is essentially parabolic but modified by the provision of four flats 70 along the sides thereof. As shown in FIG. 3, adjacent flats of adjacent reflectors abut one another to define a compact planar array of reflectors. As may be noted from FIGS. 2 and 3 the hairpin torsional section of the group of four springs 28 on each shaft are clustered in the central space provided behind each square group of four reflectors.

In addition to minimizing the overall size of the array, the use of axially mounted lamps with coaxial reflectors has been observed to provide a substantial improvement in light output as compared to an array of vertically mounted lamps with radial reflectors. Further, the light output obtainable for a given package size is significantly increased by the use of relatively large parabolic reflectors with flatted sides. For example, when employing a ¾ inch parabolic reflector with the sides flatted to fit a ⅝ inch square, and a coaxially disposed percussive lamp having an envelope volume 0.200 cc., a combustible fill comprising 19 mg. of zirconium foil shreds each having a length of about 0.200 inch, and an oxygen fill pressure of 1900 cm. Hg., the average light output generated for each lamp-reflector element was 420 zonal lumen seconds during the typical exposure interval of 0-25 msec. This compares with a light output of 350 zonal lumen seconds (0-25 msec.) obtained from the same type of lamp coaxially arranged with a ⅝ inch parabolic reflector without flats. This represents a light output gain of 20 percent.

The array of eight reflectors 12 may comprise a single preformed sheet 71 of plastic material having a light reflective coating; for example, the inwardly dished reflector surfaces 12 may be provided by vacuum forming. Toward the vertex of each reflector is provided a coaxial aperture 72 of suitable shape for fitting about the tubular flashlamp 10. If the radiation from a flashed lamp proves to be a problem by causing sympathetic ignition of an unselected lamp, the parabolic reflector skirt 12 may be extended back to cover substantially the entire lamp envelope, rather than leaving an exposed portion as illustrated in FIG. 3. Alternatively, the reflector may be shaped to have a cylindrical portion extending back from aperture 72 to cover the otherwise exposed portion of the lamp envelope.

According to an alternative embodiment of the invention, referring to FIG. 1, the array of reflectors 12 together with base 16, top 24 and side walls 20 and 22 may comprise an injection molded unitary structure of plastic material having a light reflective coating. To complete the unit, the rear wall 18, bearing the gear actuating mechanism, springs and lamps, is attached to the back of the molded structure, and the transparent window 26 is attached to the front of the unit.

In one typical embodiment of the invention employing an array of eight preformed reflectors coaxially disposed about eight axially mounted lamps of the 0.200 cc. type described above, the approximate packaging dimensions were as follows: height — 1.3 inches; width (four lamps) — 2.53 inches; depth — 0.875 inch; reflector — ¾ inch parabolic flatted to fit 5/8 inch square; depth of reflector — 0.5 inch; outside diameter of lamp envelope — 0.250 inch; and, average total length of lamp — 0.815 to 0.825 inch, of which the primer tube comprises about 0.185 inch. As described previously, each lamp-reflector element of this array can provide an average light output of about 420 zonal lumen seconds (0–25 msec.).

Although the invention has been described with respect to a specific embodiment, it will be appreciated that modifications and changes may be made by those skilled in the art without departing from the true spirit and scope of the invention. For example, the selective actuating mechanism may be of a completely different design than the illustrated gear arrangement, and the striker springs may be oriented differently to conform with the design of the actuating mechanism. Further, the number of lamp-reflector elements in the array may be varied, with a corresponding variation in the number of gears or a change in the design of the selective actuating mechanism.

What we claim is:

1. A multilamp flash unit comprising: in combination:
   a substantially planar base member;
   a substantially planar wall member secured to said base member and disposed substantially normal thereto;
   a plurality of percussively ignitable flashlamps mounted on one side of said wall member with the longitudinal axes of said lamps projecting parallel to said base member;
   a plurality of preenergized strikers mounted on said wall member and releasable to fire said flashlamps; and,
   a selective actuating mechanism supported on said wall member and having indexable means for sequentially releasing said strikers to fire respective flashlamps in response to successive indexing of said mechanism.

2. The unit of claim 1 wherein each of said flashlamps has a primer tube coaxially projecting therefrom, and said one side of said wall member contains a plurality of bores each for receiving the primer tube of a respective one of said flashlamps to provide support therefor.

3. The unit of claim 2 wherein each of said preenergized strikers is a portion of a folded torsion spring comprising a substantially hairpin torsional section having two segments joined by a bight, said striker portion projecting from one of said segments, a supporting foot projecting from the other of said segments and fixedly mounted on said one side of said wall member, and a catch formed at the tip of said foot, said striker portion crossing said foot with said catch restraining said strike portion in a cocked condition.

4. The unit of claim 1 further including an array of substantially concave reflectors each disposed coaxially about respective one of said flashlamps, the optical axes of said reflectors being substantially perpendicular to said wall member and said reflectors all facing in one direction away from the side of said wall member upon which said flashlamps are mounted.

5. The unit of claim 4 wherein said array of reflectors are defined by an injection molded unitary structure of plastic material having a light reflective coating.

6. The unit of claim 4 wherein each of said reflectors is substantially parabolic and has a plurality of flats formed therein along the sides thereof.

7. The unit of claim 4 wherein said lamps and reflectors are arranged in a unidirectional planar array of at least two rows.

8. The unit of claim 4 wherein said array of reflectors are defined by a preformed sheet of plastic material having a light reflective coating.

9. The unit of claim 4 further including means attached to said base and wall member for enclosing said flashlamps, strikers and reflectors, said enclosing means including a sheet of transparent material disposed over the light emitting side of said array.

10. The unit of claim 9 wherein said base member has an aperture therethrough, and the indexable means of said selective actuating mechanism is accessible to be actuated through the aperture in said base.

11. The unit of claim 1 wherein each of said strikers is individually releasable to fire a respective one of said flashlamps.

* * * * *